United States Patent
Boudnik et al.

(10) Patent No.: US 7,207,040 B2
(45) Date of Patent: Apr. 17, 2007

(54) MULTI-CPUS SUPPORT WITH THREAD PRIORITY CONTROL

(75) Inventors: Konstantin I. Boudnik, Castro Valley, CA (US); Weiqiang Zhang, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 604 days.

(21) Appl. No.: 10/222,535

(22) Filed: Aug. 15, 2002

(65) Prior Publication Data

US 2004/0034856 A1 Feb. 19, 2004

(51) Int. Cl.
*G06F 9/46* (2006.01)
*G06F 9/455* (2006.01)
*G06F 15/16* (2006.01)

(52) U.S. Cl. .................. 718/103; 718/1; 718/100; 718/102; 719/313; 719/318; 709/201; 709/202; 709/203

(58) Field of Classification Search ........ 718/100–108, 718/1; 709/201–203, 204–244; 455/414; 719/328, 313, 318; 717/127; 710/244
See application file for complete search history.

(56) References Cited

U.S. PATENT DOCUMENTS

| | | | | |
|---|---|---|---|---|
| 5,247,675 A | * | 9/1993 | Farrell et al. ............... | 718/103 |
| 5,423,042 A | * | 6/1995 | Jalili et al. .................. | 719/328 |
| 5,432,932 A | * | 7/1995 | Chen et al. ................. | 718/103 |
| 6,542,921 B1 | * | 4/2003 | Sager .......................... | 718/108 |
| 6,651,242 B1 | * | 11/2003 | Hebbagodi et al. ......... | 717/127 |
| 6,658,448 B1 | * | 12/2003 | Stefaniak et al. ........... | 718/104 |
| 6,658,485 B1 | * | 12/2003 | Baber et al. ................. | 719/314 |
| 6,684,280 B2 | * | 1/2004 | Chauvel et al. ............. | 710/244 |
| 6,763,371 B1 | * | 7/2004 | Jandel ......................... | 709/204 |
| 6,928,647 B2 | * | 8/2005 | Sager .......................... | 718/108 |
| 2002/0037713 A1 | * | 3/2002 | Kato ............................ | 455/414 |
| 2002/0124042 A1 | * | 9/2002 | Melamed et al. ........... | 709/102 |

* cited by examiner

*Primary Examiner*—Meng Al T. An
*Assistant Examiner*—Jennifer N. To
(74) *Attorney, Agent, or Firm*—Martine Penilla & Gencarella, LLP

(57) ABSTRACT

An invention is provided for affording thread priority control in a distributed computer system. At least one task is executed on a server, where each task includes a task identifier and a priority value. In addition, a change priority message, which includes priority value and a task identifier, is received over a network. In response, the priority value of a specific task having the same task identifier as the task identifier of the change priority message is set equal to the priority value of the change priority message. As a result, the specific task is executed at a priority level relative to the priority value of the specific task.

12 Claims, 11 Drawing Sheets

MULTI-CPUS SUPPORT WITH THREAD PRIORITY CONTROL

CROSS REFERENCE TO RELATED APPLICATIONS

This application is related to U.S. patent application No. 10/219,718, filed Aug. 14, 2002, and entitled "System and Method for Controlling and Managing Computer Farms," which are incorporated herein by reference.

BACKGROUND OF THE INVENTION

1. Field of the Invention

This invention relates generally to distributed software execution, and more particularly to thread priority control and resource contention resolution in a distributed computer environment.

2. Description of the Related Art

A server farm is a group of networked servers that are housed in one location, which streamlines internal processes by distributing the workload between the individual servers and other components of the farm. The server farm can also expedite computing processes by efficiently harnessing the power of the multiple computers (e.g., multiple servers). FIG. 1 is a block diagram of a typical prior art server farm 100. The server farm 100 includes a plurality of servers 102A–102n, which are networked together via a network 104. The server farm 100 can also include input/output systems 108 for interfacing and networking the server farm 100 to other computers or computer networks (e.g., Internet, LAN, WAN, etc.). In addition, other devices 110 that may be necessary for the particular demands of the server farm 100 can be included in the server farm 100.

The server farm 100 is controlled by a control system 106, which typically is a separate controlling computer that includes controlling software 106a. The controlling software 106a generally is specifically designed for the precise needs and design of the server farm 100. The controlling software 106A accomplishes such tasks as load balancing, tracking demand for processing power from the different servers 102a–102n, prioritizing the tasks input to the server farm 100 and scheduling and rescheduling the tasks depending on priority and demand that users place on the server farm 100. The control system 106 also can automatically replace a failed server (e.g., server 102A) with another server (e.g., server 102B).

Combining servers and processing power into a single server farm 100 has been relatively common for many years in research and academic institutions. However server farms are becoming more common as companies utilize server farms to handle the enormous amount of computerization of tasks and services that the particular company may require.

The typical prior art server farm control system software 106A includes multiple low-level applications that are specifically designed for the specific hardware and software configuration of each of the individual servers 102A–n and the server farm 100. As server farms become more and more common, the specialization and customization of the control system software 106A becomes more problematic. Each implementation of the typical low level, very specifically designed control system software 106A is very complicated. The complications arise due to the individual, specific hardware and software configuration of the server farm 100. The implementation of the specifically designed control system software 106A is repetitive because many server farms have common requirements. Therefore, customized, low-level control system software 106A is inefficient and unnecessarily difficult.

To increase efficiency of task execution, each server 102a–102n can include multiple CPUs. The multiple CPUs allow the server to process an increased number of tasks in parallel. That is, the Java virtual machine (JVM) can maintain a separate processing thread for each task executed on the CPUs. Although, task priority typically can be adjusted using specific Java software, prior art systems generally cannot adjust task priority remotely, as in a distributed computing environment.

Further, tasks often can be executed on a particular server in parallel without causing resource conflicts. However, if two tasks require the same system resource during parallel execution, resource contention problems can occur. For example, two audio testing tasks executing in parallel may attempt to utilize the same audio resource simultaneously. The resulting contention can cause problems and/or errors with the audio tasks.

In view of the foregoing, there is a need for systems and methods that allow thread priority control on distributed computing environments. That is, a need exists for systems and methods that allow control of computing resource allocation remotely. Further, the systems and methods should provide a mechanism to reduce resource contention problems that may occur when parallel tasks attempt to access the same resource.

SUMMARY OF THE INVENTION

Broadly speaking, embodiments of the present invention address these needs by providing thread priority control within a multi-CPU computer. Providing a mechanism to reduce task conflicts caused by resource contention provides additional thread control. In one embodiment, a method is disclosed for providing thread priority control in a distributed computer system. The method includes executing at least one task on a server. Each task executed on the server includes a task identifier and a priority value. In addition, a change priority message, which includes a priority value and a task identifier, is received over a network. In response, the priority value of a specific task having the same task identifier as the task identifier of the change priority message is set equal to the priority value of the change priority message. As a result, the specific task is executed at a priority level relative to the priority value of the specific task. In one aspect, each task can include a change priority method, which functions to set the priority value of the task to a specific value and accepts a priority value as an argument. In this case, the change priority method can also communicate with a local Java Virtual Machine to adjust computer resource allocation. In addition, the change priority method of the task can be called using the priority value of the change priority message. Optionally, the server can be part of a server farm, which includes a plurality of servers controlled using a control system server. In this case, the change priority message can be sent from a separate server on the server farm, from the control system server, or both.

In an additional embodiment, a method for reducing resource contention in a distributed computer environment is disclosed. The method includes finding a particular server entry on a lookup service having server entries for a plurality of servers. Each entry includes a list of attributes corresponding to a related server. A task is then examined to obtain miscellaneous prevention attributes related to the task. If any miscellaneous prevention attribute related to the task matches any miscellaneous prevention attribute related to the particular server entry, the entry is ignored and a new server entry is found. However, if all miscellaneous prevention attributes related to the task are different from all miscellaneous prevention attributes related to the particular server entry, the task is sent to the server corresponding to the server entry. The entry for the server receiving the task can be updated to include miscellaneous prevention attributes related to the task, wherein each miscellaneous prevention attribute indicates a resource needed exclusively by the related task. Optionally, the lookup service can list entries for servers that are part of a server farm. In this case, the server farm can include a control system having access to the lookup service, and the attributes for a server can include properties of the specific computer system.

A system for providing thread priority control in a distributed computer system is disclosed in a further embodiment of the present invention. The system includes a first server in communication with a network and executing at least one task. As above, each task includes a task identifier and a priority value. A second server is also included that is capable of transmitting a change priority message to the first server via the network. Also as above, the change priority message includes a priority value and a task identifier. In operation, the first server sets the priority value of a specific task executing on it, and having the same task identifier as the task identifier of the change priority message, equal to the priority value of the change priority message. In response, the task is executed at a priority level relative to the priority value of the specific task. As above, each task can include a change priority method that accepts a priority value as an argument and functions to set the priority value of the task to a specific value. Also, the change priority method can communicate with a Java Virtual Machine present on the first server to adjust computer resource allocation. The system can further include a lookup service that includes server entries for the first server and the second server, wherein each entry includes a list of attributes corresponding to the related server. In this case, each entry of the lookup service can include miscellaneous prevention attributes related to tasks executing on the related server. Generally, tasks having matching miscellaneous prevention attributes are not executed in parallel on a single server. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

Embodiments of the present invention provide thread priority control within a multi-CPU computer. More specifically, embodiments of the present invention allow thread prioritization on remote multi-CPU computer systems. Additional thread control is provided by allowing miscellaneous task prevention. Embodiments of the present invention further provide a mechanism to reduce task conflicts caused by resource contention. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

As mentioned above, thread priority is difficult to control in prior art distributed computer systems. Embodiments of the present invention address this issue by providing remote thread priority control using priority control messages in conjunction with a self-prioritizing task structure. As will be described in greater detail subsequently, each task object of the embodiments of the present invention includes a change priority method, which allows the priority of the task to be set. Thus, to change priority in a distributed computer system such as server farm, a change priority message is sent to the task, which uses the message data to set a new priority for itself.

One Java based distributed environment used in conjunction with embodiments of the present invention is known as Jini™ technology (hereinafter "Jini"), which can provide the distributed environment for remote thread priority control. Jini can be used to manage and control a dynamic network of computer systems (servers) that can each have different software/hardware configurations. As used herein, a dynamic network is defined as a network in which the computer resources may be part of the network temporarily and for a specific length of time (i.e., spontaneous). In one example, the Jini can provide spontaneous interaction between network components. In this manner, the computer systems can attach to and detach from the dynamic network of computer resources without disturbing the complete network system.

Figure 1:
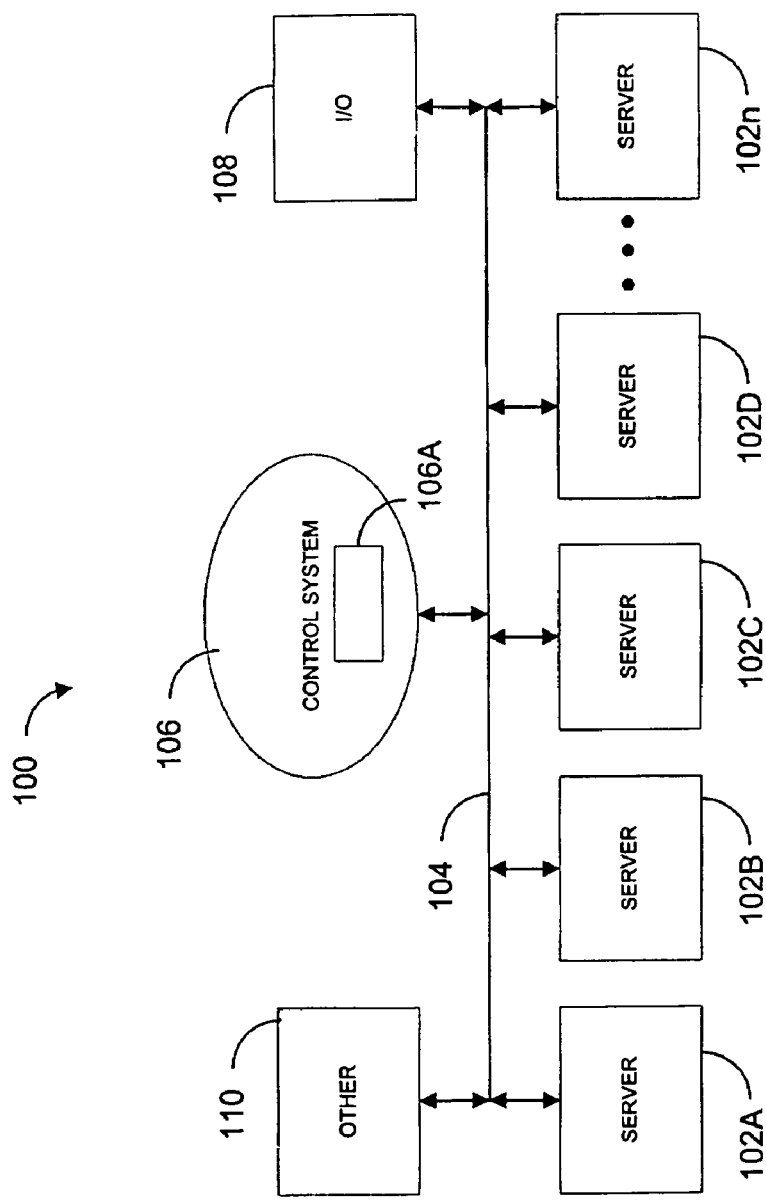
FIG. 1 shows a block diagram of a typical, prior art server farm.
Figure 2:
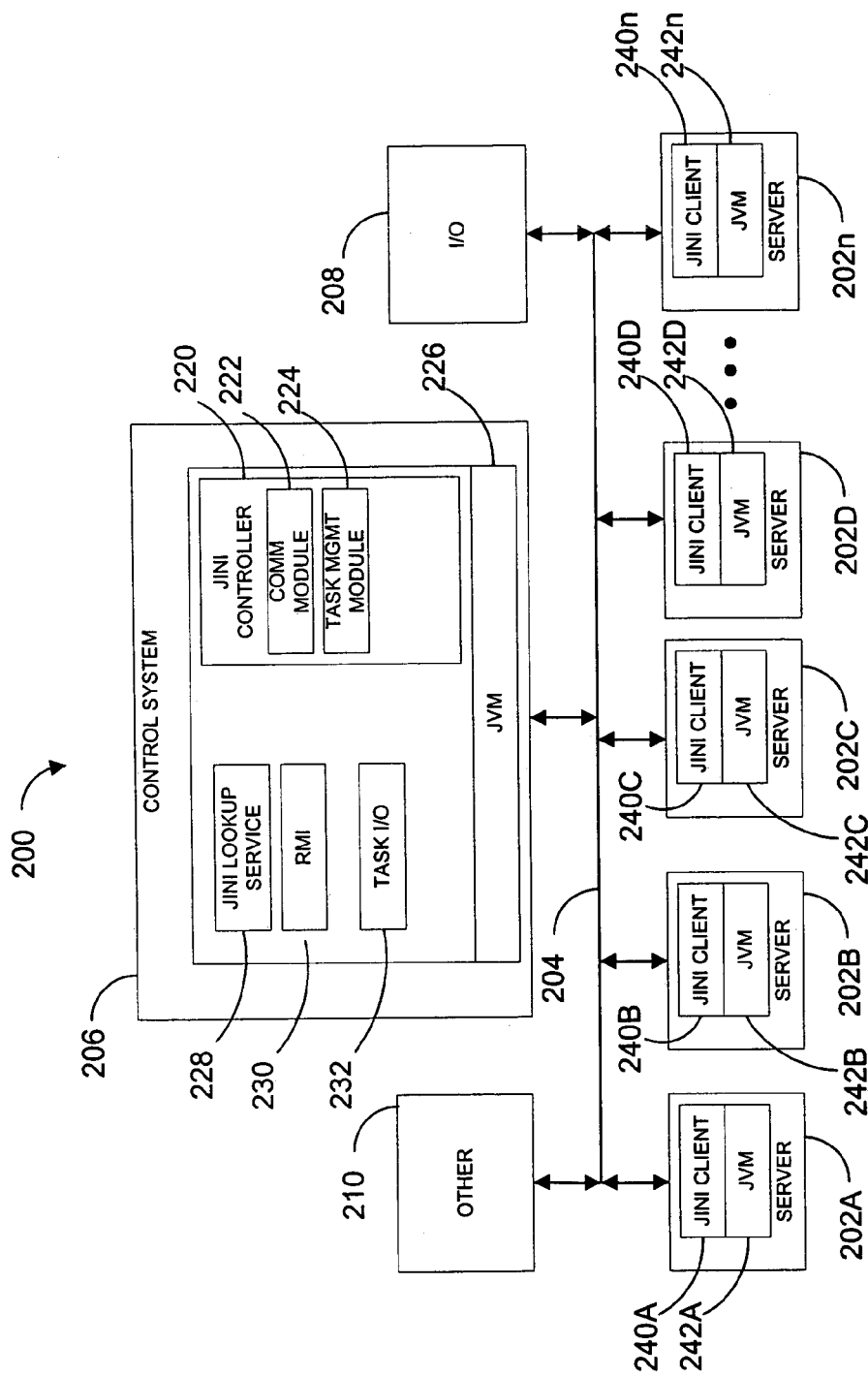
FIG. 2 shows a server farm having remote thread priority control and miscellaneous prevention for resource contention resolution, in accordance with one embodiment of the present invention.

FIG. 2 shows a server farm 200 having remote thread priority control and miscellaneous prevention for resource contention resolution, in accordance with one embodiment of the present invention. As shown in FIG. 2, the server farm 200 includes a control system 206 that implements Jini technology to interact with multiple servers 202A–n interconnected by a network 204. The control system 206, which can be maintained on one or more computers, is configured to include a Jini lookup service 228 and a Jini controller 220 configured to manage the processing of the tasks submitted to the server farm 200.

In one embodiment each of the multiple servers (i.e. computer resources) 202A–n can "join" the Jini lookup service by registering their respective proxies and the corresponding attributes, described in greater detail below. In addition, a communication module 222 is also included and is configured to manage communication between the controller 220 and the other servers 202A–n in the server farm 200. Further, a task management module 224 is included that is configured to manage the execution of one or more software processing tasks within the server farm 200.

Each server 202A–n includes a Jini client application 240A–n, which interacts with the Jini controller 220 and the Jini lookup service 228 to facilitate management of the computer farm 200. In operation, the Jini controller 220 searches the lookup service 228 for an available suitable server 202A–n to process each of the submitted tasks, as described in greater detail next with reference to Jini technology.

Jini technology is a network architecture that enables the spontaneous assembly and interaction of services and devices on a network of computer systems. Built on the Java platform, Jini technology eliminates the challenges of scale, component integration, and ad-hoc networking encountered in distributed computing environments such as a server farm 200. Jini also simplifies interactions over a network by providing a fast and easy way for clients to use available services. Further, Jini technology is configured to be wire-protocol and transport-protocol neutral.

Summarily, Jini network technology includes a communication and programming model that enables clients and Jini services to discover and connect with each other to form an impromptu (i.e., spontaneous) Jini community. As Jini is written in Java, Jini implements the mechanism, Java Remote Method Invocation Application Program Interface (API), to move objects around the network.

Referring to back FIG. 2, using the Jini clients 240a–n and JVMs 242a–n, tasks can be dispatched to the servers 202a–n via the network 204 using a universal task exchange system. The universal task exchange system includes multiple universal task messages including: a reserve service provider message, an envelope message, a run task message, a pause task message, a resume task message, a restart task message, a stop task message, a task completed message, an unreserve message, and a change priority message. Further information describing the universal task exchange system can be found in U.S. patent application Ser. No. 10/219,718, filed Aug. 14, 2002, and entitled "System and Method for Controlling and Managing Computer Farms," which is incorporated herein by reference.

Figure 3:
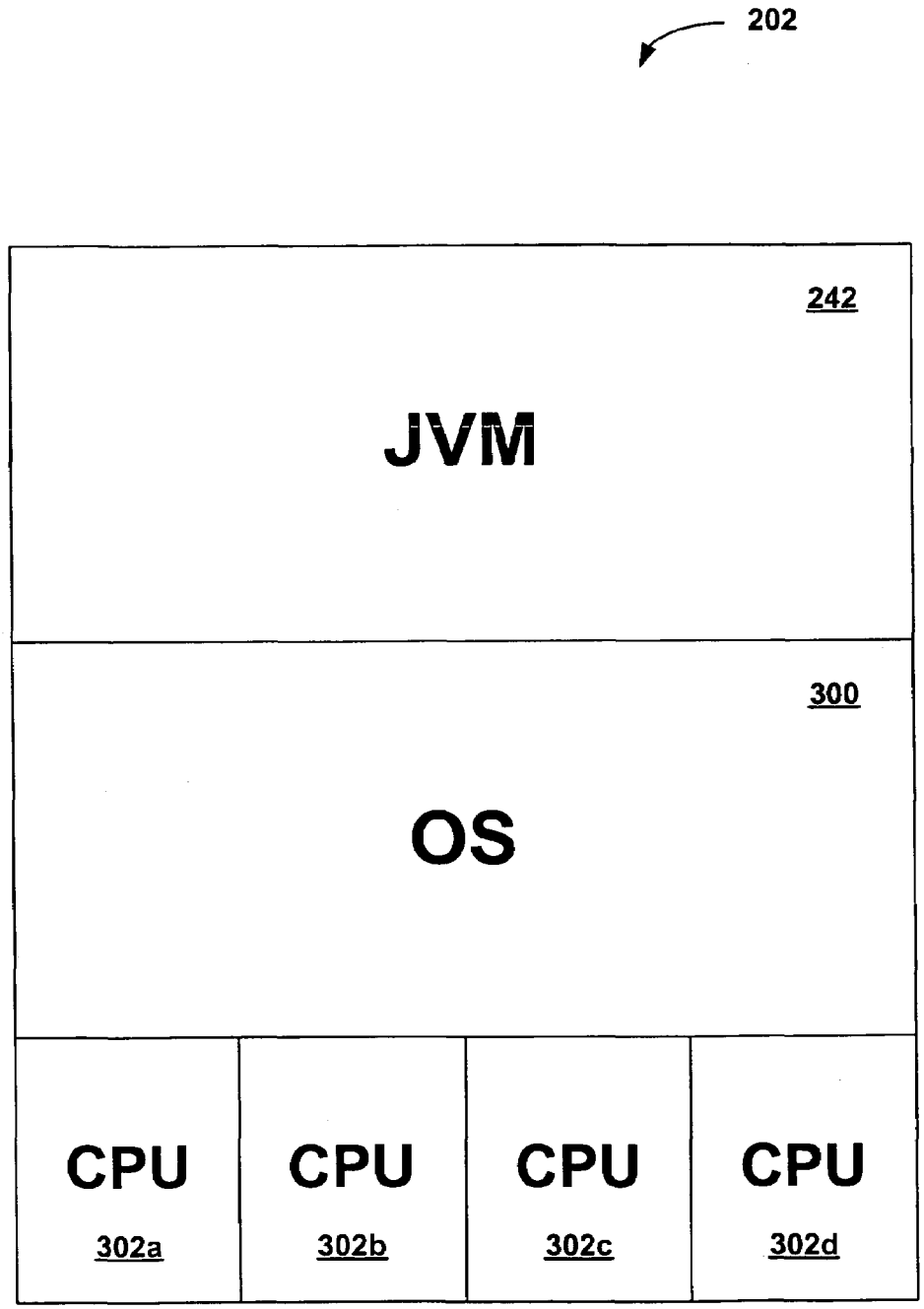
FIG. 3 is a block diagram showing a computer system having multiple CPUs executing in a Java based environment.

To increase efficiency of task execution, each server can include multiple CPUs. FIG. 3 is a block diagram showing a computer system 202 having multiple CPUs executing in a Java based environment. As shown in FIG. 3, the computer system 202 includes a plurality of CPUs 302a–d, and a JVM 242 residing on an operating system 300. Although the exemplary computer system 202 is illustrated having only four CPUs 302a–d, it should be noted that any number of CPUs can be utilized in the multiple CPU computer system 202 of the embodiments of the present invention.

The plurality of CPUs 302a–d allows the multiple CPU computer system 202 to process an increased number of tasks in parallel. That is, the JVM 242 can maintain a separate processing thread for each task executed on the CPUs 302a–d. However, executing too many tasks on a single computer system 202 can seriously slow down processing, no matter how many CPUs 302 are present on the computer system. Hence, embodiments of the present invention can assign a plurality of 'slots' to each computer system 202, each indicating available resources for task processing. To determine the number of slots for a computer, the number of tasks that can be processed in parallel on the computer system 202, without causing serious performance degradation, is estimated. The computer system 202 is then assigned a number of slots equal to this estimated number. Thereafter, a "thread available" flag can be used to indicate whether or not the computer system 202 can currently process additional tasks.

For example, the "thread available" flag is set to "TRUE" until the number of tasks being currently processed equals the total number of slots available on the computer system 202, at which point the "thread available" flag is set to "FALSE." In addition, the status of each processing thread can be specifically identified. In one embodiment, a number of "free threads" and a number of "busy threads" can be included in the attributes of the computer system 202. When the number of "busy threads" is equal to the total number of processing threads in the computer system 202, the "thread available" flag is set to "FALSE."

For example, in a four slot computer system 202, if three processing threads in the computer system 202 are allocated to a first task, a second task, and a third task, respectively, then the number "free threads" is set to "1" and the number of "busy threads" is set to "3." Further, the "thread available" flag is set to "TRUE." When a fourth processing thread in the computer system 202 is allocated to a fourth task, the number "free threads" is set to "0" and the number of "busy threads" is set to "4," and the "thread available" flag is set to "FALSE."

Figure 4:
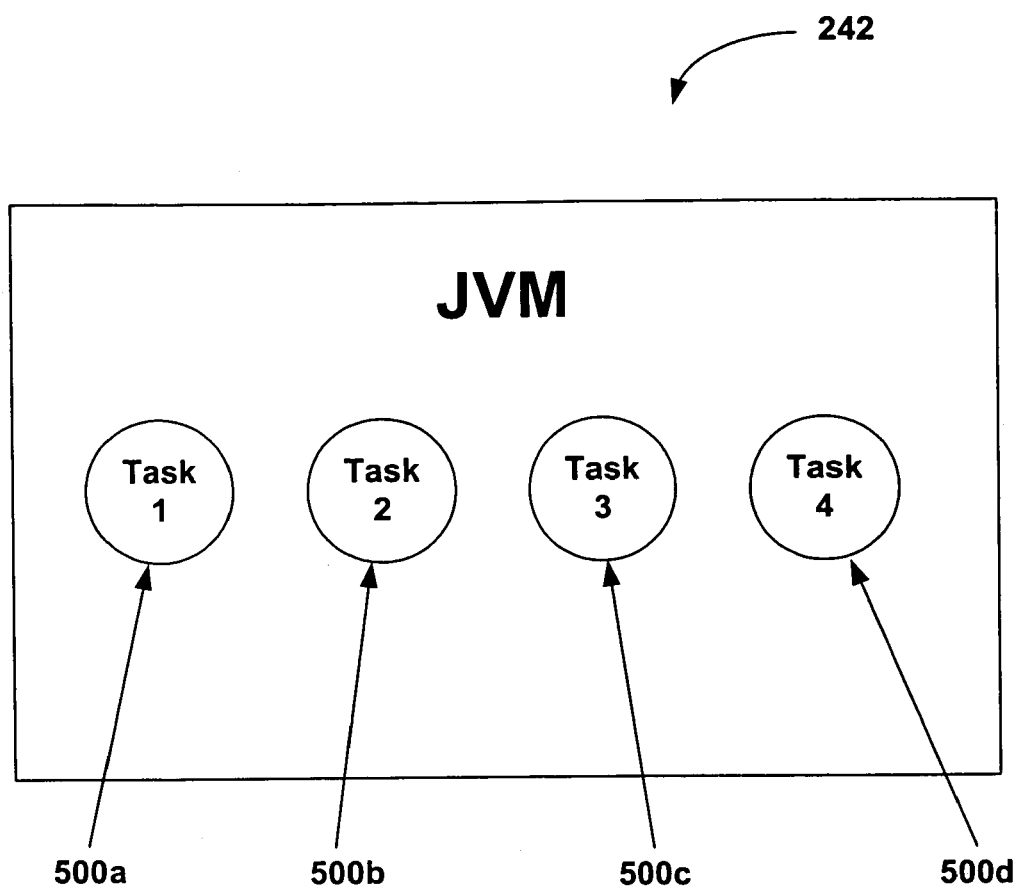
FIG. 4 is a block diagram showing a JVM executing parallel tasks, in accordance with an embodiment of the present invention.

In addition to providing a mechanism to prevent task overloading on a single computer system, embodiments of the present invention further allow task prioritization in a distributed computer environment. FIG. 4 is a block diagram showing a JVM 242 executing parallel tasks, in accordance with an embodiment of the present invention. In the example of FIG. 4, four tasks 500a–500d are executing in parallel in the JVM 242. Generally, the JVM 242 by default processes each task 500a–500d with an equal priority, that is, with equal computing resources, as illustrated in FIG. 7A.

Figure 7B:
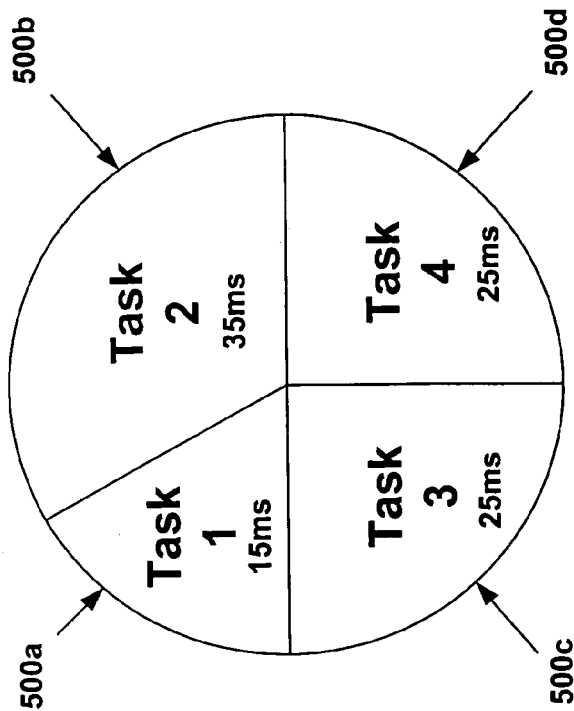
FIG. 7B is a pie chart illustrating JVM computer resource allocation resulting from a change priority messages, in accordance with an embodiment of the present invention.
Figure 7A:
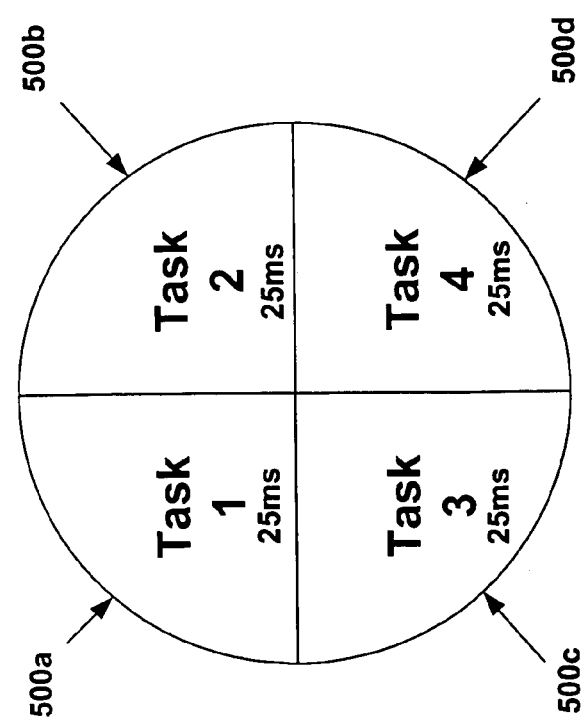
FIG. 7A is a pie chart illustrating default JVM computer resource allocation, in accordance with an embodiment of the present invention.

FIG. 7A is a pie chart illustrating default JVM computer resource allocation, in accordance with an embodiment of the present invention. As shown in FIG. 7A, the JVM 242 by default shares the computing resources of the computer system equally with each task 500a–500d. Thus, for example, if a particular computer system had 100 ms to share between each task 500a–500d, the JVM 242 allocates 25 ms to each task 500a–500d. However, it is desirable to allow the user to change the task priority levels. Although, task priority typically can be adjusted using specific Java software, prior art systems generally could not adjust task priority remotely, as in a distributed computing environment. Advantageously, embodiments of the present invention provide this functionality via change priority messages and local change priority methods.

Figure 5:
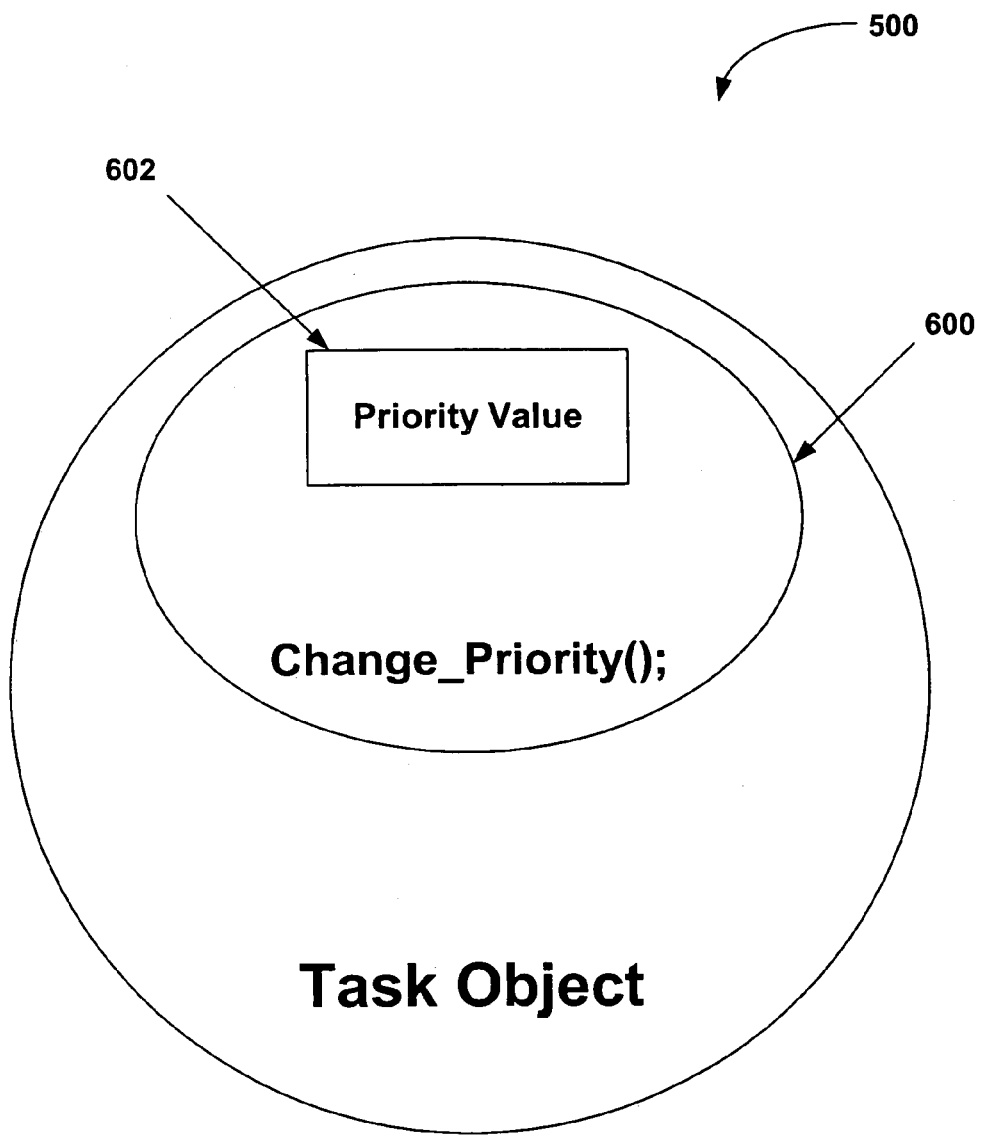
FIG. 5 is an illustration showing a task object having distributed prioritization capability, in accordance with an embodiment of the present invention.

FIG. 5 is an illustration showing a task object 500 having distributed prioritization capability, in accordance with an embodiment of the present invention. As illustrated, the self-contained task object 500 includes a change priority method 600, which functions to set the priority value 602 of the task to a selected value. The priority value 602 represents a level of priority that should be given to the task object 500 relative to other tasks executing in parallel on the same computer system. The system developer can determine the actual meaning the priority value. For example, higher values can represent tasks with higher priority levels. On the other hand, some embodiments can be implemented such that low priority values 602 represent tasks with higher priority levels.

In addition to setting the priority value 602, the change priority method 600 communicates with the local JVM to adjust the computer resources allocated to the various tasks executing on the computing environment. It should be borne in mind that changing the priority level on one task can affect the computer resources allocated to other tasks. In operation, the local service provider calls the change priority method 600 in response to receiving a change priority message, as discussed in greater detail next with reference to FIG. 6.

Figure 6:
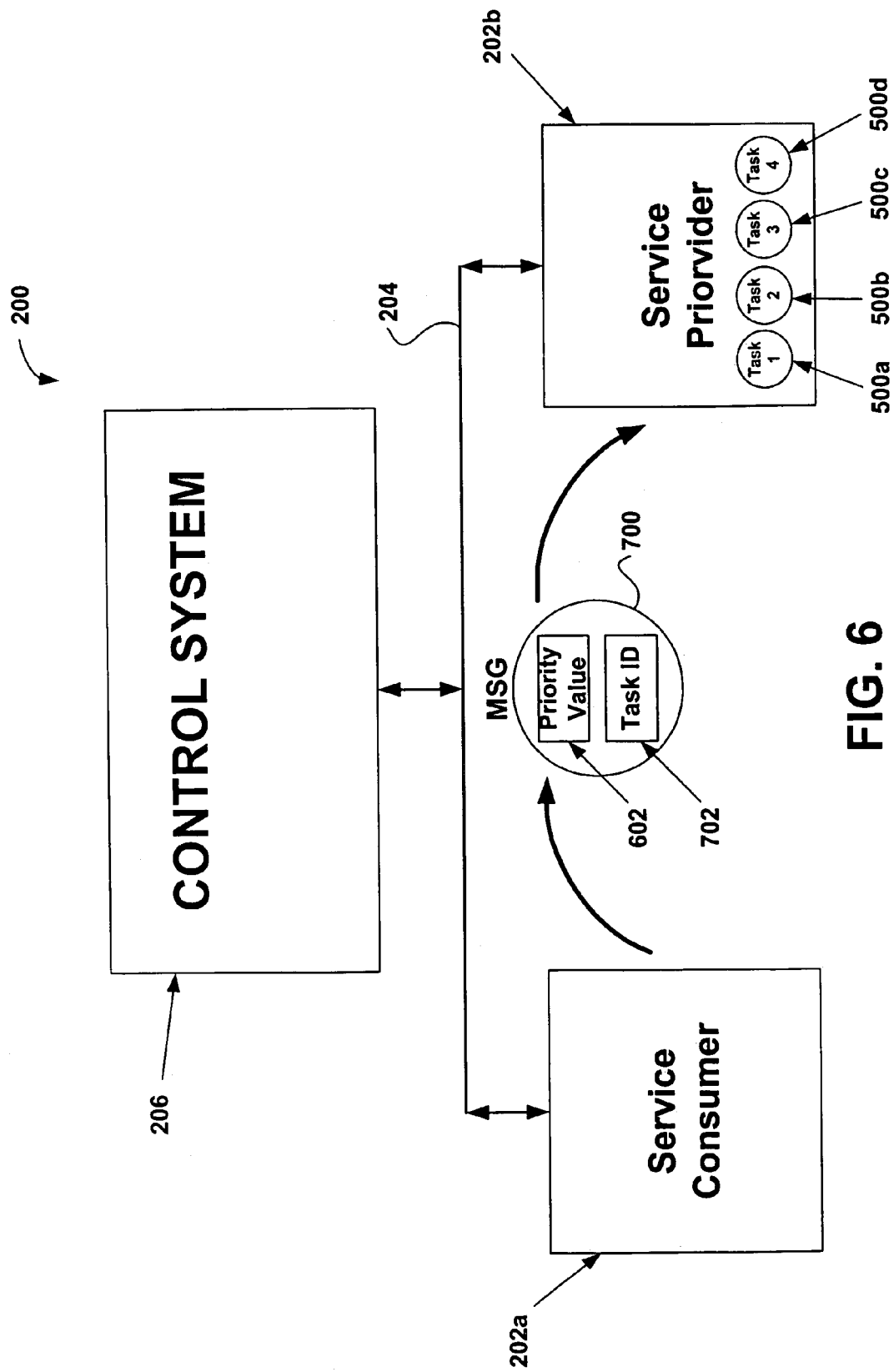
FIG. 6 shows a server farm having remote thread priority control, in accordance with an embodiment of the present invention.

FIG. 6 shows a server farm 200 having remote thread priority control, in accordance with an embodiment of the present invention. As mentioned previously, the server farm 200 includes a control system 206 that implements Jini technology to interact with a multiple servers 202a and 202b interconnected by a network 204. The control system 206, which can be maintained on one or more computers, is configured to include a Jini lookup service and a Jini controller, which is configured to manage the processing of the tasks submitted to the server farm 200.

As shown in FIG. 6, the servers have been divided into a service consumer 202a and service provider 202b. Embodiments of the present invention allow servers to utilize services provided from other services. For example, the service consumer 202a can be a server that utilizes services provided by the service provider 202b, which is another server of the same server farm 200. Additional information on service provider/service consumer interaction can be found in U.S. patent application Ser. No. 10/219,718, filed Aug. 14, 2002, and entitled "System and Method for Controlling and Managing Computer Farms," which is incorporated herein by reference.

As shown in the example of FIG. 6, a plurality of tasks 500a–500d are executed in parallel on the service provider 202b. To change the priority level of any task 500a–500d, a change priority message 700 is sent to the service provider 202b executing the task. The change priority message 700 includes a priority value 602 and a task identifier 702. The task identifier 702 indicates the particular task that is to have the prior level updated, and the priority value 602 indicates the new priority level that should be assigned to the indicated task. Hence, in the example of FIG. 6, the service consumer 202a can change the priority of a task executing on the service provider 202b, such as task 2 500b. In particular, the service consumer 202a sends a change priority message 700 having the task ID 702 of task 2 500b and a particular priority value 602.

Once the service provider 202b receives a change priority message 700, the service provider 202b examines the change priority message 700 to determine the task identifier 702. The service provider 202b then calls the change priority method of the task identified by the task identifier 702, using the new priority value 602 as the priority argument. The change priority method then sets the task priority to the priority value 602, and invokes JVM methods to affect the thread priorities of the computer system, as illustrated in FIG. 7B.

FIG. 7B is a pie chart illustrating JVM computer resource allocation resulting from a change priority messages, in accordance with an embodiment of the present invention. In the example of FIG. 7A, four task have been executed on a computer system, each having a priority value 5. Thus, as illustrated in FIG. 7A, and discussed above, the JVM allocates resources evenly between all the tasks, in this case allocating 25 ms to each task. In the example of FIG. 7B, the priority value of task 1 500a has been changed to a value of 3, and the priority value of task 2 500b has been changed to a value of 7. As a result, the JVM allocates resources using the new priority values relative to the other tasks executing on the computer system. In this case, the JVM allocates 15 ms to task 1 500a, 35 ms to task 2 500b, and 25 ms each to task 3 500c and task 4 500d, which each have a priority value of 5.

Figure 8:
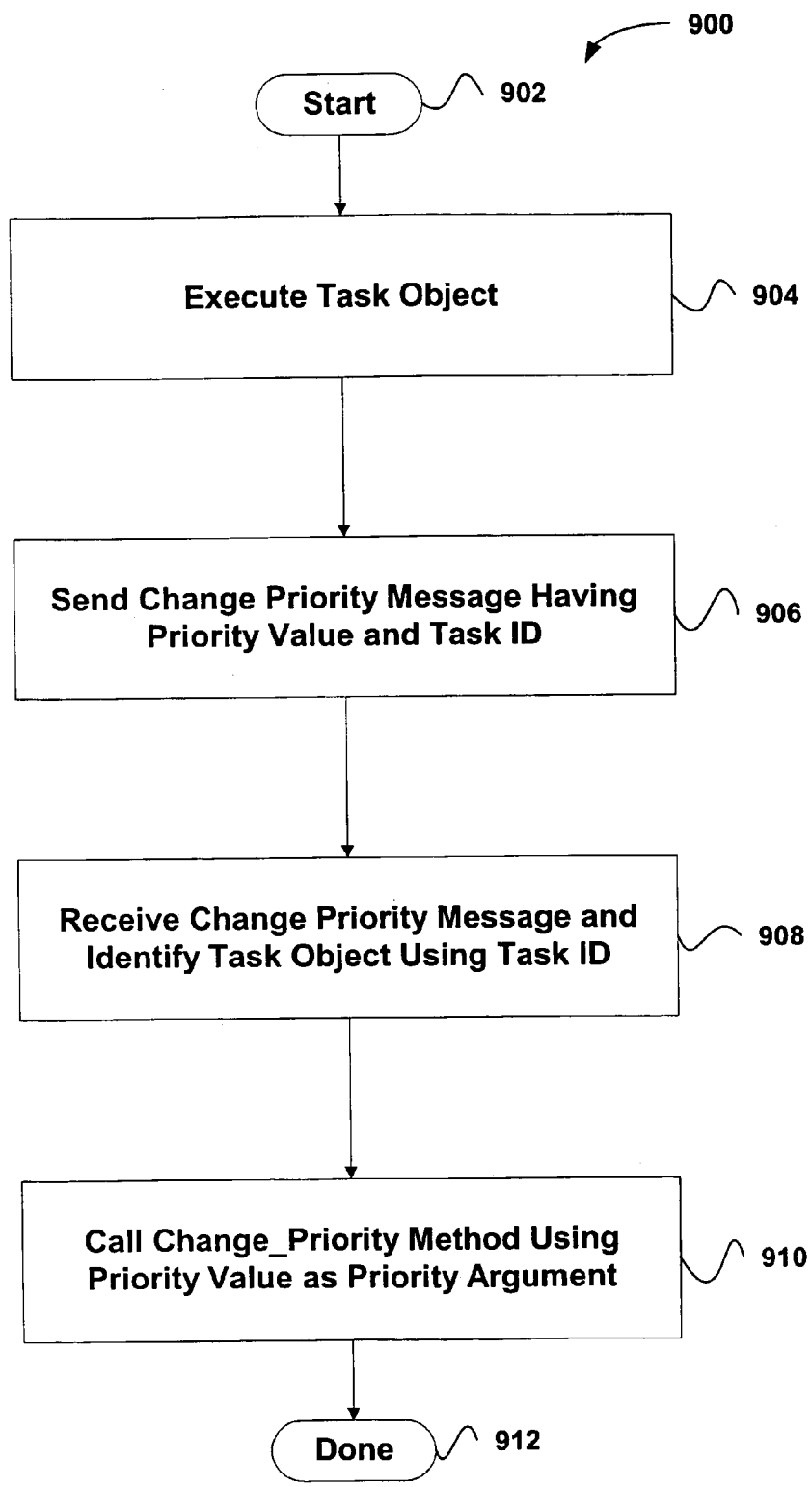
FIG. 8 is a flowchart showing a method for remote thread prioritization in a distributed computer system, in accordance with an embodiment of the present invention.

FIG. 8 is a flowchart showing a method 900 for remote thread prioritization in a distributed computer system, in accordance with an embodiment of the present invention. In an initial operation 902, preprocess operations are performed. Preprocess operations can include provisioning the distributed computing environment, initializing the Jini lookup service, and other preprocess operations that will be apparent to those skilled in the art after a careful reading of the present disclosure.

In operation 904, the task object is executed. As mentioned previously, servers of the embodiments of the present invention are capable of executing a plurality of tasks in parallel. In addition, particular servers may include multiple CPUs, thus increasing the computing resources available to perform parallel tasks. In operation 904, a task object having a change priority method, as described with reference to FIG. 5, is executed. Generally, the task object is initially executed with a particular default priority value, for example, a priority level of 5. Although embodiments of the present invention have been thus far described having a default priority level of 5, it should be borne in mind that any value can be assigned as a default priority value to tasks executed on the computer system.

A change priority message is then sent to the server executing the task object, in operation 906. As mentioned previously, the change priority message includes a priority value and a task identifier. The task identifier indicates the particular task that is to have the prior level updated, and the priority value indicates the new priority level that should be assigned to the indicated task. Typically a service consumer creates and sends the change priority message to the server executing the task. However, it should be noted that the message can be sent from any computer authorized to change thread priority of the receiving computer system.

In operation 908, the change priority is received and the server identifies the task object. Once the change priority message is received, the change priority message is examined to determine the task identifier. As discussed above, the task identifier indicates the particular task that is to have the prior level changed.

The change priority method of the identified task is then called, in operation 910. In particular, the change priority method of the identified task is called using the new priority value included in the change priority message as the priority argument for the change priority method call. The change priority method then sets the task priority to the priority value, and invokes JVM methods to affect the thread priorities of the computer system.

Post process operations are performed in operation 912. Post process operations can include priority change confirmation, further thread prioritization, and other post process operations that will be apparent to those skilled in the art after a careful reading of the present disclosure. In this manner, embodiments of the present invention advantageously allow remote thread prioritization in distributed computer environments.

Figure 9:
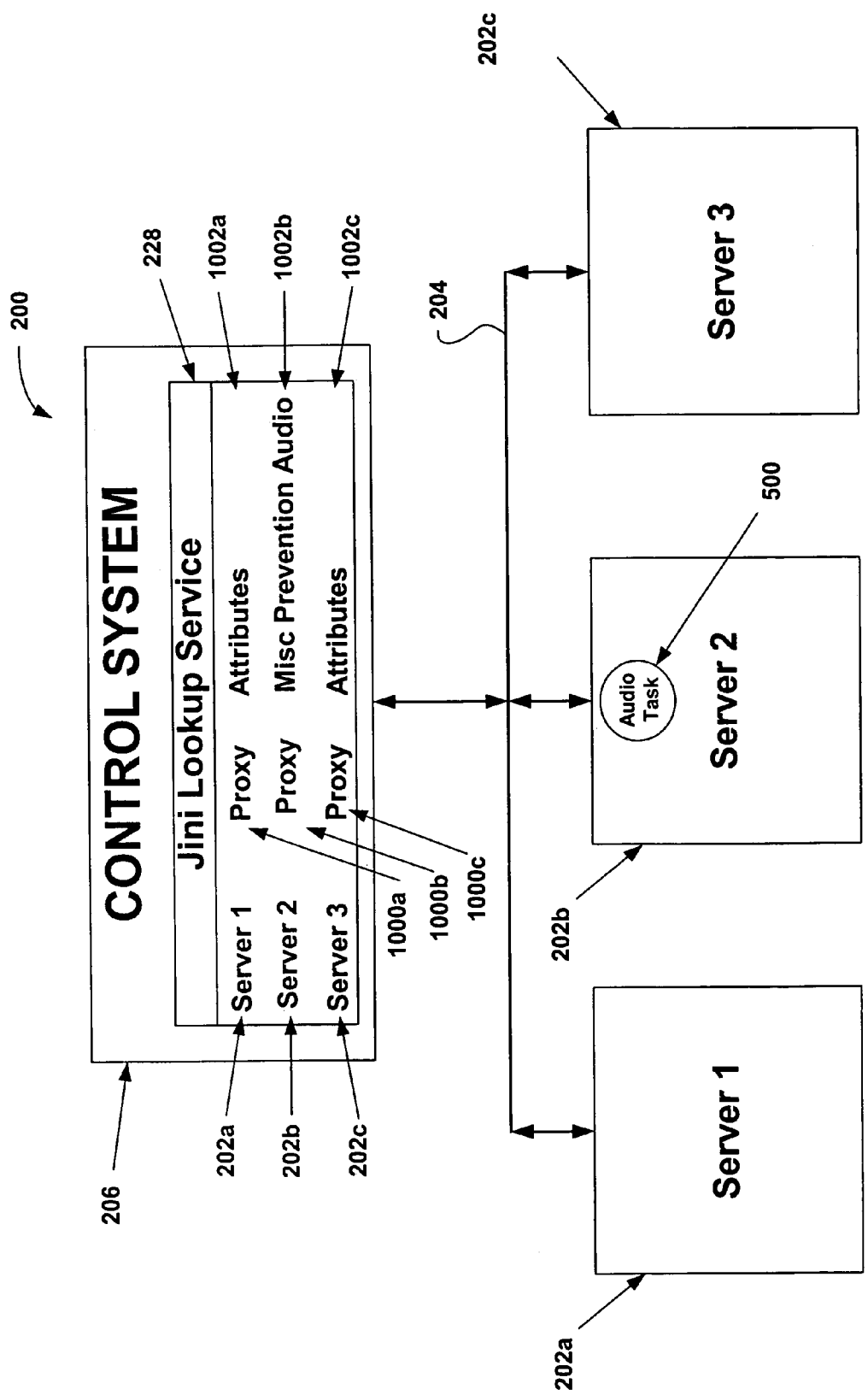
FIG. 9 is a block diagram showing a server farm 200 having remote miscellaneous prevention attributes to reduce resource contention, in accordance with an embodiment of the present invention.

Embodiments of the present invention further provide a mechanism to reduce task conflicts caused by resource contention. FIG. 9 is a block diagram showing a server farm 200 having remote miscellaneous prevention attributes to reduce resource contention, in accordance with an embodiment of the present invention. As mentioned previously, the server farm 200 includes a control system 206 that implements Jini technology to interact with a multiple servers 202a and 202b, which are interconnected by a network 204. Also as above, the control system 206 is configured to include a Jini lookup service 228 and a Jini controller, which is configured to manage the processing of the tasks submitted to the server farm 200.

The Jini lookup service 228 includes an entry for each server 202a–202c in the server farm 200. Each entry includes a proxy 1000a–1000c and a set of attributes 1002a–1002c for the corresponding server 202a–202c. Each proxy 1000a–1000c is an object having service attributes 1002a–1002c and communication instructions. Through implementing discovery and join processes, the servers 202a–202c are found and thereafter registered with a lookup service 228 on a network. As used herein, registering a server 202a–202c is defined as sending the service proxy 1000a–1000c to the lookup service 228.

The lookup service 228 is equivalent to a directory or an index of available servers 202a–202c wherein the proxies 1000a–1000c for each of the servers 202a–202c and their associated code are stored. When a server 202a–202c is requested, the proxy 1002a–1002c associated with the requested server 202a–202c is sent to the requesting client, thus enabling the client to use the requested server 202a–202c. Once dispatched, the proxy 1000a–1000c can be configured to conduct all communication between the client and the Jini service. For further details on Jini technology, please refer to K. Arnold et al., The Jini Specification (1999) and W. Keith Edwards, Core Jini (1999), which is incorporated herein by reference.

The attributes 1002a–1002b for each server 202a–202c indicate the capabilities of the corresponding server 202a–202c and are used to find services. For example, server 1 202a can utilize the attributes 1002a–1002c listed in the Jini lookup service 228 to find an appropriate server to execute a test needing, for example, audio equipment. For example, if server 2 had audio equipment, the attributes of the server 2 can indicate this fact. Thus, server 1 can examine the Jini lookup service 228 to find a server having audio equipment attributes, and once found, use that server to execute the audio test.

Often tasks can be executed on a particular server 202a–202c in parallel without causing resource conflicts. For example, a single server 202b can perform an audio test and a mouse pointer test in parallel because neither test will utilize the same resource, namely, the audio equipment and the mouse. However, if two tasks require the same system resource during parallel execution, resource contention problems can occur. For example, two audio testing tasks executing in parallel on server 2 202b may attempt to utilize the same audio resource simultaneously. The resulting contention can cause problems and/or errors with the audio tasks. Embodiments of the present invention address this issue by utilizing miscellaneous prevention attributes.

In particular, tasks can be given a miscellaneous prevention attribute, which will cause the server to exclude other tasks having the same miscellaneous prevention attribute. For example, if the audio task 500 executing on server 2 202b includes a miscellaneous prevention audio attribute 1002b, server 2 202b will not execute other tasks having the miscellaneous prevention audio attribute 1002b until the audio task 500 is completed. This is accomplished utilizing the miscellaneous prevention attributes in conjunction with the Jini lookup service 228, as described next with reference to FIGS. 10 and 11, below.

Figure 10:
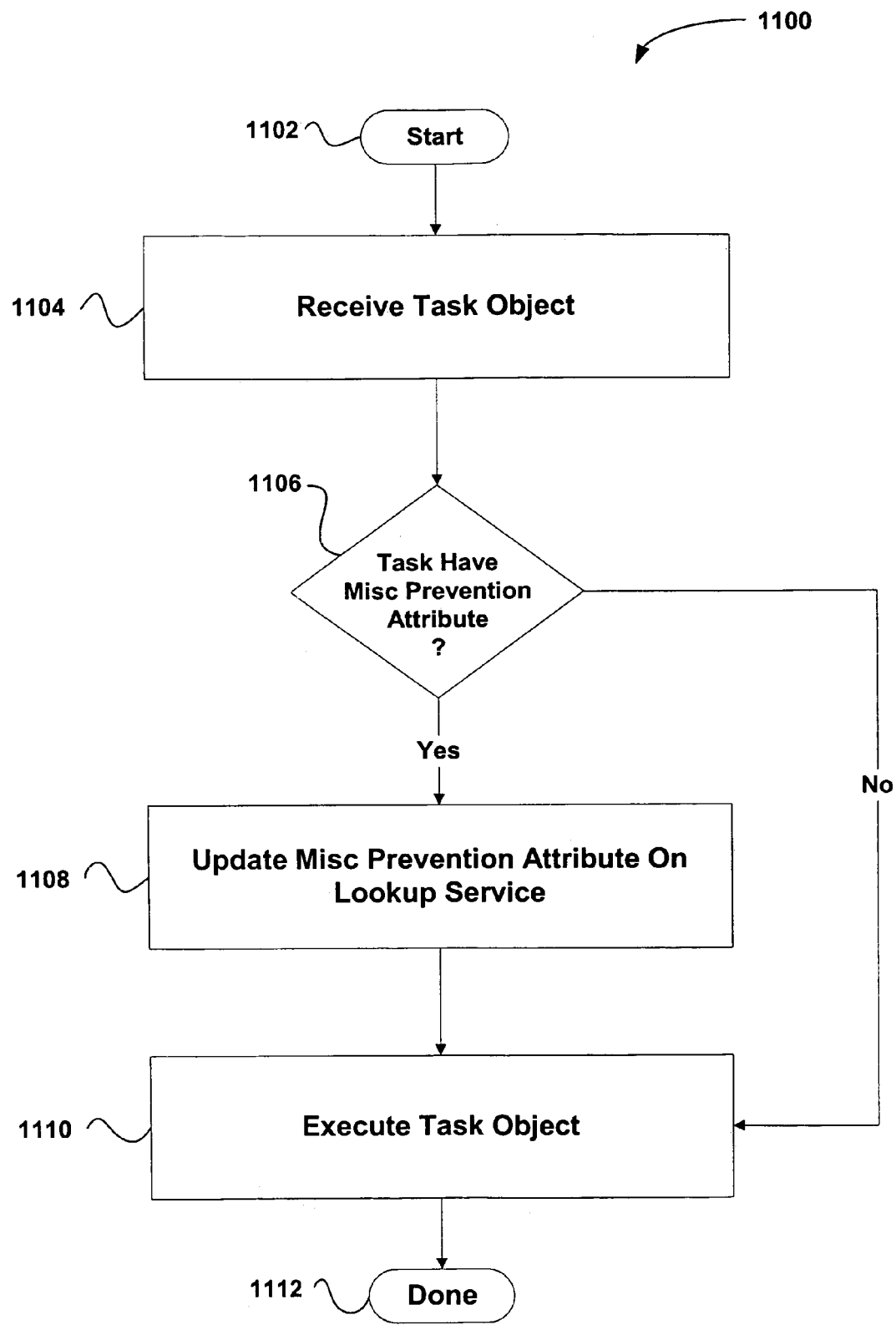
FIG. 10 is a flowchart showing a method for updating resource contention resolution attributes in a distributed computing environment, in accordance with an embodiment of the present invention.

FIG. 10 is a flowchart showing a method 1100 for updating resource contention resolution attributes in a distributed computing environment, in accordance with an embodiment of the present invention. In an initial operation 1102, preprocess operations are performed. Preprocess operations can include obtaining a service provider proxy, initiating communication between a server consumer and the service provider, and other preprocess operations that will be apparent to those skilled in the art after a careful reading of the present disclosure.

In operation 1104, a task object is received. As mentioned previously, servers of the embodiments of the present invention are capable of executing a plurality of tasks, which can be received from a service consumer and/or the control system. Each task generally performs a series of instructions to generate result data, which is stored on the computer system. However, as mentioned above, tasks executed in parallel may encounter resource contention problems. Hence, to address this issue, each received task is examined prior to execution, as indicated in operation 1106.

In operation 1106, a decision is made as to whether the received task includes any miscellaneous prevention attributes. Each received task is examined prior to execution to determine whether the task includes miscellaneous prevention attributes, which indicate resources the task requires, and which must be used exclusive of other tasks. If the task includes miscellaneous prevention attributes, the method 1100 continues to operation 1108, otherwise, the method 1100 braches to operation 1110.

In operation 1108, the miscellaneous prevention attributes for the server are updated on the Jini Lookup service. As mentioned previously, the Jini Lookup service includes a listing of attributes for each server. In operation 1108, the server sends a message to the control system, which requests the lookup service entry for the server to be updated to include the miscellaneous prevention attribute for the task. For example, if an audio task includes a miscellaneous prevention audio attribute the Jini Lookup Service is updated to include the miscellaneous prevention audio attribute in the entry for the server where the audio task will be executed.

The task is then executed, in operation 1110, and post process operations are performed in operation 1112. Post process operations can include receiving messages directed for the task, changing the priority level of the task, and other post process operations that will be apparent to those skilled in the art. Once the Jini Lookup Service has been updated, as illustrated in method 1100, contention issues can be avoided as illustrated next with reference to FIG. 11.

Figure 11:
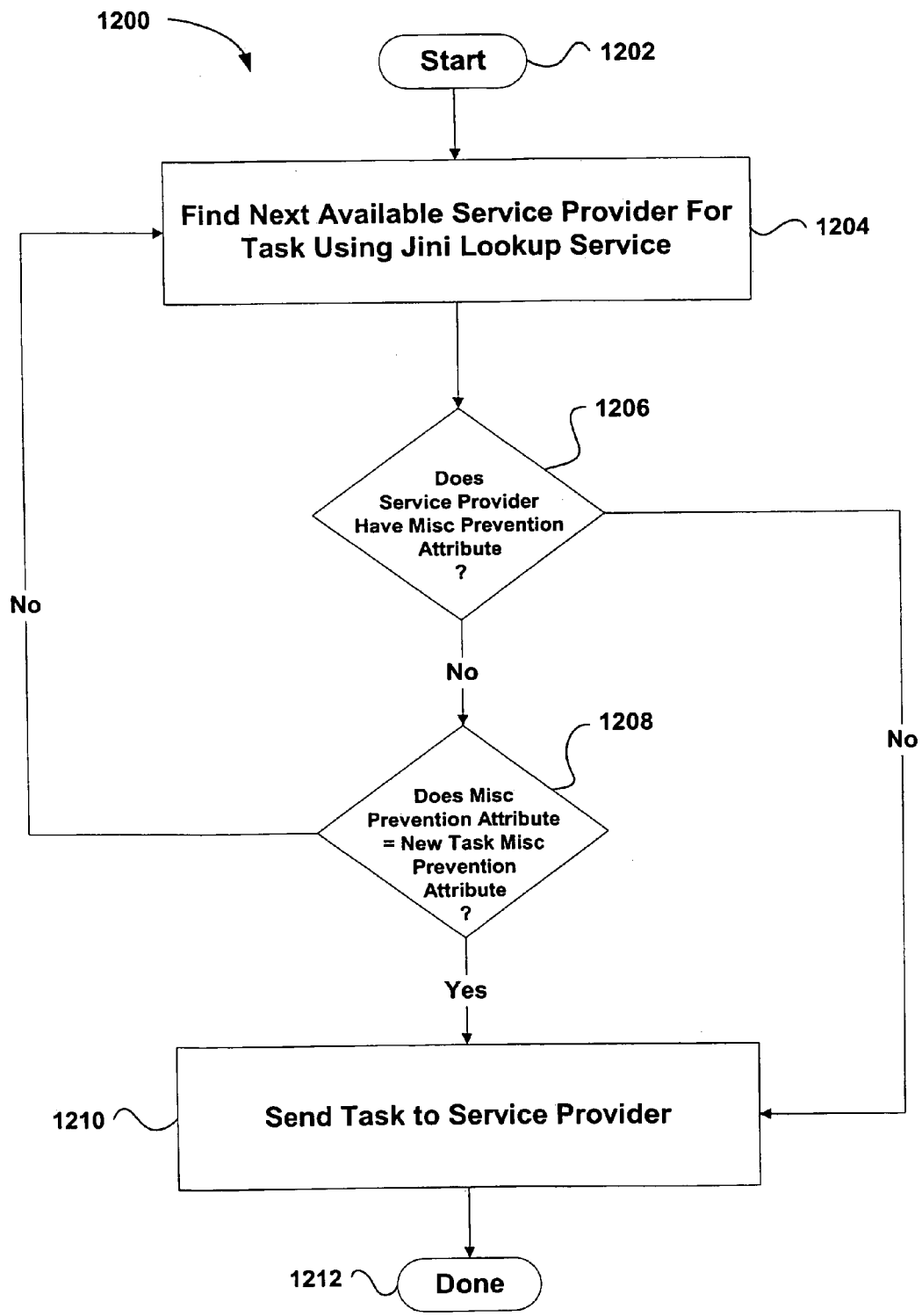
FIG. 11 is a flowchart showing a method for avoiding resource contention issues during task execution, in accordance with an embodiment of the present invention.

FIG. 11 is a flowchart showing a method 1200 for avoiding resource contention issues during task execution, in accordance with an embodiment of the present invention. In an initial operation 1202, preprocess operations are performed. Preprocess operations can include, for example, obtaining a task to be performed, updating the Jini Lookup Service with miscellaneous prevention attributes of particular tasks executing on the servers of the server farm, and other preprocess operation that will be apparent to those skilled in the art after a careful reading of the present disclosure.

The next available service provider that can perform the task is found using the Jini Lookup Service, in operation 1204. As discussed above, embodiments of the present invention utilized the Jini Lookup Service to find appropriate servers to perform specific tasks. Generally, the Jini Lookup Service is utilized to identify servers having properties required for particular tasks. By examining the attributes of servers on the Jini Lookup Service, an appropriate service provider can be found that is capable of performing the task.

Once an appropriate service provider is found, a decision is made as to whether the service provider includes miscellaneous prevention attributes listed on the Jini Lookup Service, in operation 1206. If miscellaneous prevention attributes are listed on the Jini Lookup Service for the service provider, the method 1200 continues to operation 1208. Otherwise, the method 1200 branches to operation 1210.

In operation 1208, a decision is made as to whether any listed miscellaneous prevention attribute matches any miscellaneous prevention attributes for the new task. As discussed above, miscellaneous prevention attributes indicate tasks that require limited exclusive access to the server. That is, only one task with a particular miscellaneous prevention attribute should be executed on any one server in parallel. Hence, if any listed miscellaneous prevention attribute matches any miscellaneous prevention attributes for the new task, the server is skipped and the next available service provider is found in operation 1204. Otherwise, the server is suitable and the method 1200 continues to operation 1210.

In operation 1210, the task is submitted to the above mentioned service provider. In this manner, only one task with a particular miscellaneous prevention attribute is executed on any one server. As a result, resource contention problems can be prevented using the miscellaneous prevention attributes of the embodiments of the present invention. Post process operations are performed in operation 1212. Post process operations can include, for example, execution of the submitted task, updating of the Jini Lookup Service based on the miscellaneous prevention attributes of the new task, and other post process operations that will be apparent to those skilled in the art after a careful reading of the present disclosure.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for providing thread priority control in a distributed computer system, comprising the method operations of:

executing at least one task of a plurality of tasks on a server in communication with a network, each task including a task identifier and a priority value to enable thread priority control, each task also including a change priority method that functions to set the priority value of the task to a specific priority value and accepts the specific priority value as an argument;

receiving a change priority message remotely over the network, the change priority message including a priority value and a task identifier; and setting the priority value of a specific task of the at least one task being executed on the server in communication with the network and having the same task identifier as the task identifier of the change priority message, equal to the priority value of the change priority message, wherein the specific task is executed with allocated resources determined by the priority value of the change priority message relative to other tasks of the plurality of tasks executing in parallel in the distributed computer system.

2. A method as recited in claim 1, wherein the change priority method further communicates with a local Java Virtual Machine to adjust computer resource allocation.

3. A method as recited in claim 2, further comprising the operation of calling the change priority method of the specific task using the priority value of the change priority message.

4. A method as recited in claim 1, wherein the server is part of a server farm, the server farm having a plurality of servers controlled using a control system server.

5. A method as recited in claim 4, wherein the change priority message is sent from a separate server on the server farm.

6. A method as recited in claim 4, wherein the change priority message is sent from the control system server.

7. A system for providing thread priority control in a distributed computer system, comprising:
- a first server in communication with a network, the first server executing at least one task of a plurality of tasks, each task including a task identifier and a priority value, each task also including a change priority method that functions to set the priority value of the task to a specific priority value and accents the specific priority value as an argument; and
- a second server, in communication with the network, capable of transmitting a change priority message to the first server remotely via the network, the change priority message including a priority value and a task identifier,
- wherein the first server sets the priority value of a specific task of the at least one task executing on the first server and having the same task identifier as the task identifier of the change priority message, equal to the priority value of the change priority message, and wherein the specific task is executed with allocated resources determined by the priority value of the change priority message relative to other tasks of the plurality of tasks executing in parallel in the distributed computer system.

8. A system as recited in claim 7, wherein the change priority method further communicates with a Java Virtual Machine present on the first server to adjust computer resource allocation.

9. A system as recited in claim 8, wherein the change priority method of the specific task is called using the priority value of the change priority message as an argument.

10. A system as recited in claim 7, further comprising a lookup service, the lookup service having server entries for the first server and the second server, each entry including a list of attributes corresponding to the related server.

11. A system as recited in claim 10, wherein each entry of the lookup service includes miscellaneous prevention attributes related to tasks executing on the related server.

12. A system as recited in claim 11, wherein tasks having matching miscellaneous prevention attributes are not executed in parallel on a single server.

* * * * *